(12) United States Patent
Akaba et al.

(10) Patent No.: US 7,485,828 B2
(45) Date of Patent: Feb. 3, 2009

(54) RESIDUAL STRESS IMPROVING APPARATUS FOR PIPING TECHNICAL FIELD

(75) Inventors: Takashi Akaba, Kobe (JP); Shuho Tsubota, Takasago (JP); Kenji Nishikawa, Kobe (JP); Noriaki Sugimoto, Kobe (JP); Shoji Kushimoto, Kobe (JP); Takashi Ishide, Takasago (JP); Takahiro Ohta, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 226 days.

(21) Appl. No.: 10/591,120

(22) PCT Filed: Jul. 28, 2005

(86) PCT No.: PCT/JP2005/013802

§ 371 (c)(1),
(2), (4) Date: Aug. 30, 2006

(87) PCT Pub. No.: WO2006/011540

PCT Pub. Date: Feb. 2, 2006

(65) Prior Publication Data

US 2007/0181541 A1 Aug. 9, 2007

(30) Foreign Application Priority Data

Jul. 29, 2004 (JP) ............................ 2004-222223

(51) Int. Cl.
*B23K 26/08* (2006.01)

(52) U.S. Cl. ............................... 219/121.8; 219/121.74

(58) Field of Classification Search ............ 219/121.74, 219/121.8, 121.6, 121.85
See application file for complete search history.

(56) References Cited

U.S. PATENT DOCUMENTS 5,491,317 A * 2/1996 Pirl ........................ 219/121.63
6,476,345 B1 * 11/2002 Sator ..................... 219/121.63

FOREIGN PATENT DOCUMENTS

| JP | 58-170177 U | | 11/1983 |
| JP | 7-9171 A | | 1/1995 |
| JP | 8-19881 A | | 1/1996 |
| JP | 9-52188 A | * | 2/1997 |

(Continued)

OTHER PUBLICATIONS

International Search Report mailed Oct. 25, 2005 of International Application PCT/JP2005/013802.

*Primary Examiner*—Geoffrey S Evans
(74) *Attorney, Agent, or Firm*—Westerman, Hattori, Daniels & Adrian, LLP.

(57) ABSTRACT

A residual stress improving apparatus for piping, which can heat an outer peripheral surface of piping to reduce (including eliminate) the residual stress of the piping is provided. The apparatus has a laser head portion, and circumferential direction moving mechanism composed of a ring rail and a rotational travel bogie. Further, the apparatus may adjust the reflection direction of laser light so that the laser light reflected by the outer peripheral surface of the piping does not return to the laser head, and adjust the delivery direction of the laser light so that the outer peripheral surface of the bending pipe portion located forwardly, in the pipe axis direction, of the laser head is irradiated with the laser light.

12 Claims, 7 Drawing Sheets

FOREIGN PATENT DOCUMENTS

| | | | | |
|---|---|---|---|---|
| JP | 9-174270 A | * | 7/1997 | |
| JP | 2001-150178 A | | 6/2001 | |
| JP | 2002-1582 A | | 1/2002 | |
| JP | 2004-130314 A | | 4/2004 | |
| JP | 2005-232586 A | | 9/2005 | |
| JP | 2006-15399 A | * | 1/2006 | |

* cited by examiner

RESIDUAL STRESS IMPROVING APPARATUS FOR PIPING TECHNICAL FIELD

TECHNICAL FIELD

This invention relates to a residual stress improving apparatus for piping and, more particularly, to a residual stress improving apparatus for piping, which is used to reduce (including eliminate) residual tensile stress generated in the inner peripheral surface of piping by welding or the like.

BACKGROUND ART

What matters in installing piping in a nuclear power plant and other large plants is residual tensile stress generated in the inner peripheral surface of the piping. If pipings are connected by welding, for example, residual stress occurs in a weld zone of the pipings. Under this residual stress, stress corrosion cracking (SCC) may occur in the piping, shortening the life of the piping. Thus, it is desirable to reduce the residual stress generated in the piping by welding or the like.

As a residual stress improving apparatus for piping, intended for reducing the residual stress of piping, the apparatus described in Patent Document 1, for example, is known. This apparatus includes an arc generation ring located on the side of the outer periphery of piping, and a ring coil disposed to pinch the ring. If a magnetic field is generated by the ring coil, an arc is produced between the arc generation ring and the piping to heat the piping. Upon heating of the piping, the residual stress of the piping is reduced.

As a residual stress improving apparatus for piping, intended for reducing the residual stress of piping, a high frequency induction heating apparatus or the like is known widely and generally. As a prior art document relevant to the present case, the following Patent Document 1 is available.

Patent Document 1: Japanese Patent Application Laid-Open No. 2001-150178

DISCLOSURE OF THE INVENTION

Problems to Be Solved by the Invention

However, the above-described conventional residual stress improving apparatus for piping is large in scale. With the high frequency induction heating apparatus, in particular, a high frequency power needs to be supplied to an induction heating coil. Thus, a required supply power is very great, and there is need to cool the inner peripheral surface of piping to be heated. Equipment for this purpose is also necessary.

The piping to be heated may include not only those having a straight pipe portion, but also those having an L-shaped bending pipe portion (elbow pipe portion). Thus, there has been a demand for the development of an apparatus capable of heating the outer peripheral surface of a bending pipe portion, as well as an apparatus capable of heating only the outer peripheral surface of a straight pipe portion.

The present invention has been accomplished in the light of the above-described situations. It is an object of the invention to provide a residual stress improving apparatus for piping, which can heat the outer peripheral surface of piping to reduce (including eliminate) the residual stress of the piping, whose apparatus configuration is relatively compact, and which can also heat the outer peripheral surface of a bending pipe portion.

Means for Solving the Problems

A residual stress improving apparatus for piping according to a first aspect of the invention, intended for solving the above problems, is a residual stress improving apparatus for piping, arranged to irradiate an outer peripheral surface of piping having a straight pipe portion with laser light, comprising:

a laser head portion holding one laser head or a plurality of the laser heads for delivering the laser light; and circumferential direction moving means for moving the laser head, together with the laser head portion, along the outer peripheral surface of the straight pipe portion, and along a circumferential direction about a pipe axis of the straight pipe portion.

A residual stress improving apparatus for piping according to a second aspect of the invention is the residual stress improving apparatus for piping according to the first aspect of the invention, characterized in that an orientation of the laser head is adjusted in a plane intersecting the pipe axis of the piping, whereby a direction of delivery of the laser light is adjusted in the plane so that the laser light reflected by the outer peripheral surface of the piping does not return to the laser head.

A residual stress improving apparatus for piping according to a third aspect of the invention is the residual stress improving apparatus for piping according to the first aspect of the invention, further comprising reflection direction adjusting means for adjusting an orientation of the laser head in a plane intersecting the pipe axis of the piping to adjust a direction of delivery of the laser light in the plane, thereby adjusting a direction of reflection of the laser light so that the laser light reflected by the outer peripheral surface of the piping does not return to the laser head.

A residual stress improving apparatus for piping according to a fourth aspect of the invention is the residual stress improving apparatus for piping according to any one of the first to third aspects of the invention, characterized in that the piping has the straight pipe portion, and a bending pipe portion continued from the straight pipe portion, and an orientation of the laser head is adjusted in a plane including the pipe axis of the piping, whereby a direction of delivery of the laser light is adjusted in the plane so that an outer peripheral surface of the bending pipe portion located forwardly, in a direction of the pipe axis, of the laser head is irradiated with the laser light.

A residual stress improving apparatus for piping according to a fifth aspect of the invention is the residual stress improving apparatus for piping according to any one of the first to third aspects of the invention, characterized in that the piping has the straight pipe portion, and a bending pipe portion continued from the straight pipe portion, and the residual stress improving apparatus for piping further comprises delivery direction adjusting means for adjusting an orientation of the laser head in a plane including the pipe axis of the piping, thereby adjusting a direction of delivery of the laser light in the plane so that an outer peripheral surface of the bending pipe portion located forwardly, in a direction of the pipe axis, of the laser head is irradiated with the laser light.

A residual stress improving apparatus for piping according to a sixth aspect of the invention is the residual stress improving apparatus for piping according to the fourth or fifth aspect of the invention, further comprising:

pipe axis direction moving means for moving the laser head portion along the pipe axis direction, thereby making it possible to adjust a position of irradiation with the laser light on the outer peripheral surface of the bending pipe portion.

A residual stress improving apparatus for piping according to a seventh aspect of the invention is the residual stress improving apparatus for piping according to any one of the fourth to sixth aspects of the invention, further comprising:

oscillating means for moving the laser head in an oscillatory manner along the pipe axis direction; and output adjusting means for adjusting an output of the laser light so that the laser light delivered from the laser head at each oscillation position of the laser head has a uniform irradiation intensity on the outer peripheral surface of the bending pipe portion.

A residual stress improving apparatus for piping according to an eighth aspect of the invention is the residual stress improving apparatus for piping according to any one of the fourth to sixth aspects of the invention, characterized in that a plurality of the laser heads are arranged along the pipe axis direction, and the residual stress improving apparatus for piping further comprises output adjusting means for adjusting an output of the laser light so that the laser light delivered from each of the plural laser heads has a uniform irradiation intensity on the outer peripheral surface of the bending pipe portion.

A residual stress improving apparatus for piping according to a ninth aspect of the invention is the residual stress improving apparatus for piping according to any one of the first to third aspects of the invention, characterized in that the piping has the straight pipe portion, and a bending pipe portion continued from the straight pipe portion, and the residual stress improving apparatus for piping further comprises pivoting means for pivoting the laser head portion about a pivot center in a plane including the pipe axis, the pivot center being a pivot shaft located on a rearward side, in a direction of the pipe axis, of the laser head portion, thereby making it possible to bring a forward side, in the pipe axis direction, of the laser head portion close to and away from an outer peripheral surface of the bending pipe portion.

A residual stress improving apparatus for piping according to a tenth aspect of the invention is the residual stress improving apparatus for piping according to the ninth aspect of the invention, further comprising:

pipe axis direction moving means for moving the laser head portion along the pipe axis direction, thereby making it possible to adjust a position of irradiation with the laser light on the outer peripheral surface of the bending pipe portion.

Effects of the Invention

The residual stress improving apparatus for piping according to the first aspect of the invention comprises a laser head portion holding one laser head or a plurality of the laser heads for delivering the laser light; and circumferential direction moving means for moving the laser head, together with the laser head portion, along the outer peripheral surface of the straight pipe portion, and along a circumferential direction about a pipe axis of the straight pipe portion. Thus, the residual stress of the piping can be reduced (eliminated) by heating the outer peripheral surface of the piping with the laser light. Moreover, compared with the conventional apparatus, the configuration of the present apparatus is compact. Thus, this apparatus can be installed and operated in a relatively narrow, limited space at a decreased cost.

The residual stress improving apparatuses for piping according to the second to tenth aspects of the invention produce not only the same effects as those of the first aspect of the invention, but also the effects mentioned below.

The residual stress improving apparatus for piping according to the second aspect of the invention is characterized in that the orientation of the laser head is adjusted in a plane intersecting the pipe axis of the piping, whereby the direction of delivery of the laser light is adjusted in the plane so that the laser light reflected by the outer peripheral surface of the piping does not return to the laser head. Thus, the laser head (lenses provided in the laser head) can be prevented from being damaged by the reflection of the laser light.

The residual stress improving apparatus for piping according to the third aspect of the invention further comprises the above-mentioned reflection direction adjusting means. This reflection direction adjusting means can adjust the direction of reflection of the laser light. Thus, damage to the laser head (lenses provided in the laser head) due to the reflection of the laser light can be prevented more reliably.

The residual stress improving apparatus for piping according to the fourth aspect of the invention is characterized in that the orientation of the laser head is adjusted in a plane including the pipe axis of the piping, whereby the direction of delivery of the laser light is adjusted in the plane so that the outer peripheral surface of the bending pipe portion located forwardly, in the direction of the pipe axis, of the laser head is irradiated with the laser light. Thus, the outer peripheral surface of the bending pipe portion can be irradiated with the laser light, so that the residual stress of the bending pipe portion can be reduced (eliminated). That is, a residual stress improving apparatus for piping, which is preferred for the bending pipe portion, can be achieved.

The residual stress improving apparatus for piping according to the fifth aspect of the invention is characterized by having the above-mentioned delivery direction adjusting means. This delivery direction adjusting means can adjust the direction of delivery of the laser light. Thus, the outer peripheral surface of the bending pipe portion can be irradiated with the laser light more reliably, so that the residual stress of the bending pipe portion can be reduced (eliminated) more reliably. That is, a residual stress improving apparatus for piping, which is more preferred for the bending pipe portion, can be achieved.

The residual stress improving apparatus for piping according to the sixth aspect of the invention is characterized by having the above-mentioned pipe axis direction moving means. This pipe axis direction moving means moves the laser head portion in the pipe axis direction, thereby making it possible to adjust, as appropriate, the position of irradiation with the laser light on the outer peripheral surface of the bending pipe portion. Thus, it becomes possible to irradiate, for example, the outer peripheral surface on the ventral side of the bending pipe portion (i.e., the side with a smaller radius of curvature), and the outer peripheral surface on the dorsal side of the bending pipe portion (the side with a larger radius of curvature) with the laser light reliably.

The residual stress improving apparatus for piping according to the seventh aspect of the invention is characterized by having the above-mentioned output adjusting means. This output adjusting means can uniformize the irradiation intensity, on the outer peripheral surface of the bending pipe portion, of the laser light delivered from the laser head at each oscillating position. Thus, the outer peripheral surface of the bending pipe portion can be heated with the laser light more properly and efficiently.

The residual stress improving apparatus for piping according to the eighth aspect of the invention is characterized by having the above-mentioned output adjusting means. This output adjusting means can uniformize the irradiation intensity, on the outer peripheral surface of the bending pipe portion, of the laser light delivered from each of the plurality of laser heads. Thus, the outer peripheral surface of the bending pipe portion can be heated with the laser light more properly and efficiently.

The residual stress improving apparatus for piping according to the ninth aspect of the invention is characterized by having the above-mentioned pivoting means. This pivoting means pivots the laser head portion in the plane, including the pipe axis, about the pivot shaft as the pivot center located on the rearward side in the pipe axis direction of the laser head portion, thereby enabling the forward side in the pipe axis direction of the laser head portion to approach and separate from the outer peripheral surface of the bending pipe portion. Thus, the laser head portion can be approached to the outer peripheral surface of the bending pipe portion, and the outer peripheral surface can be irradiated with the laser light, with the laser head portion being prevented from interfering with the outer peripheral surface, such as the outer peripheral surface on the ventral side of the bending pipe portion (the side with a smaller radius of curvature) or the outer peripheral surface on the dorsal side of the bending pipe portion (the side with a larger radius of curvature). Thus, the outer peripheral surface of the bending pipe portion can be efficiently heated, so that the residual stress of the bending pipe portion can be reduced. That is, a residual stress improving apparatus for piping, which is preferred for the bending pipe portion, can be achieved.

The residual stress improving apparatus for piping according to the tenth aspect of the invention is characterized by having the above-mentioned pipe axis direction moving means. This pipe axis direction moving means moves the laser head portion in the pipe axis direction, thereby making it possible to adjust, as appropriate, the position of irradiation with the laser light on the outer peripheral surface of the bending pipe portion. Thus, the laser head portion can be approached to the outer peripheral surface, and the outer peripheral surface can be irradiated with the laser light, with the interference of the laser head portion with the outer peripheral surface on the ventral side and dorsal side of the bending pipe portion being prevented more reliably. Thus, the outer peripheral surface of the bending pipe portion can be heated more efficiently, so that the residual stress of the bending pipe portion can be reduced. That is, a residual stress improving apparatus for piping, which is more preferred for the bending pipe portion, can be achieved.

BRIEF DESCRIPTION OF THE DRAWINGS

[FIG. 3](a) is a view taken in the direction of B in FIG. 1, and [FIG. 3](b) is a view taken in the direction of C in FIG. 1.

[FIG. 4](a) and [FIG. 4](b) are explanation drawings showing the actions and effects of a reflection direction adjusting means provided in the residual stress improving apparatus for piping.

[FIG. 5](a) and [FIG. 5](b) are views showing a configuration example of a multi-type laser head configuration.

DESCRIPTION OF THE NUMERALS AND SYMBOLS

1 residual stress improving apparatus for piping, 2 piping (straight pipe), 2A straight pipe portion, 2B bending pipe portion, 2a outer peripheral surface, 2b pipe axis, 3 ring rail, 3A, 3B ring rail member, 3a outer peripheral surface, 3b gear, 3c, 3d end portion, 4 bolt, 5 rotational travel bogie, 6 laser head portion, 7 laser head, 8 gear, 9 bearing, 10 circumferential direction drive motor, 11a, 11b circumferential direction guide roller, 12 support frame, 13 linear rail, 14 ball screw shaft, 15 bearing, 16 linear bush, 17 ball nut, 18 axial direction drive motor, 19 linear motor, 19A linear motor stationary portion, 19B linear motor moving portion, 21 roller, 22 tilt drive motor, 23A laser light, 23B reflected light, 24 slide member, 25 optical fiber, 26 weld zone, 41 residual stress improving apparatus for piping, 42 weld zone, 43 laser head portion, 44 support member, 45 tilt drive motor, 45a rotating shaft, 46 linear motor, 46A linear motor stationary portion, 46B linear motor moving portion, 48 laser head, 49 tilt drive motor, 61 residual stress improving apparatus for piping, 62 laser head, 63 laser head portion, 64 linear motor, 64A linear motor stationary portion, 64B linear motor moving portion, 65 support member, 66 welding, 67 linear motor, 67A linear motor stationary portion, 67B linear motor moving portion, 68 linear motor, 68A linear motor stationary portion, 68B linear motor moving portion, 69 support member, 70 slot, 71 coupling portion, 72 coupling shaft, 73 coupling portion, 74 coupling member, 75 guide roller, 76 pivot shaft, 77 coupling portion, 78 optical fiber, 79 linear motor, 79A linear motor stationary portion, 79B linear motor moving portion, 80 tilt drive motor.

Best Mode for Carrying out the Invention

Embodiments of the present invention will now be described in detail based on the accompanying drawings.

Embodiment 1

Figure 1:
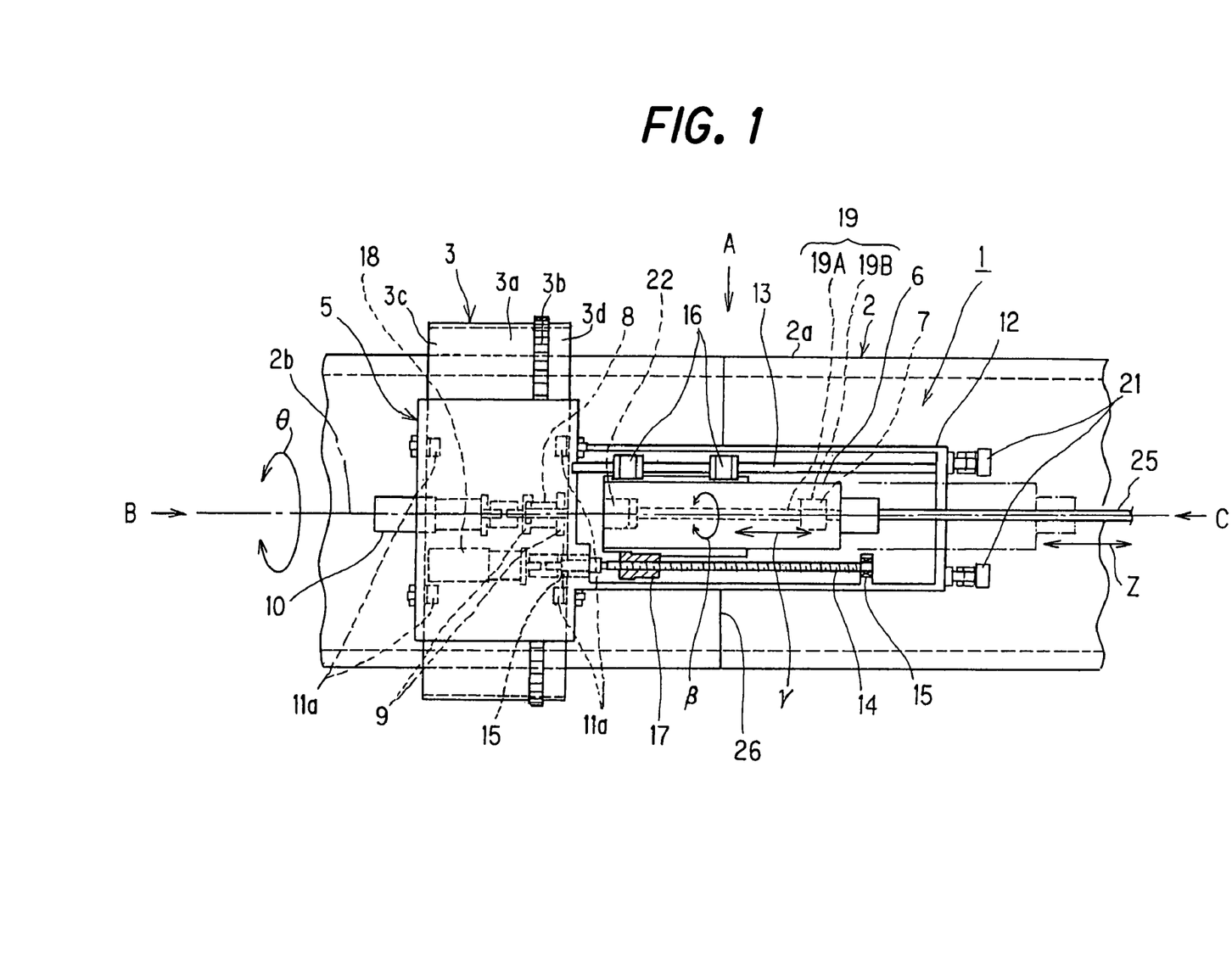
[FIG. 1] is a plan view, partly broken away, showing the configuration of a residual stress improving apparatus for piping according to Embodiment 1 of the present invention.
Figure 2:
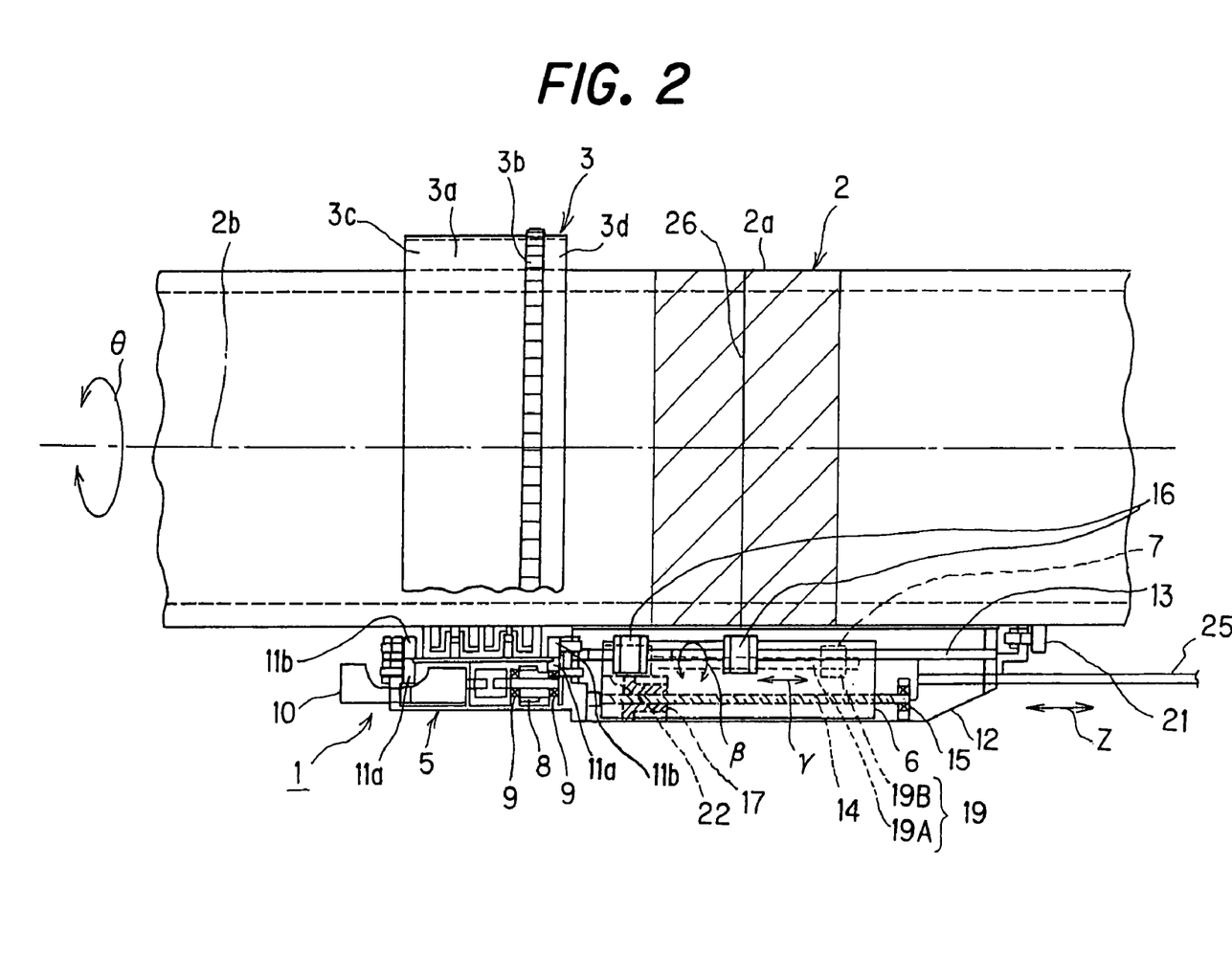
[FIG. 2] is a side view (a view taken in the direction of A in FIG. 1), partly broken away, showing the configuration of the residual stress improving apparatus for piping.
Figure 3A:
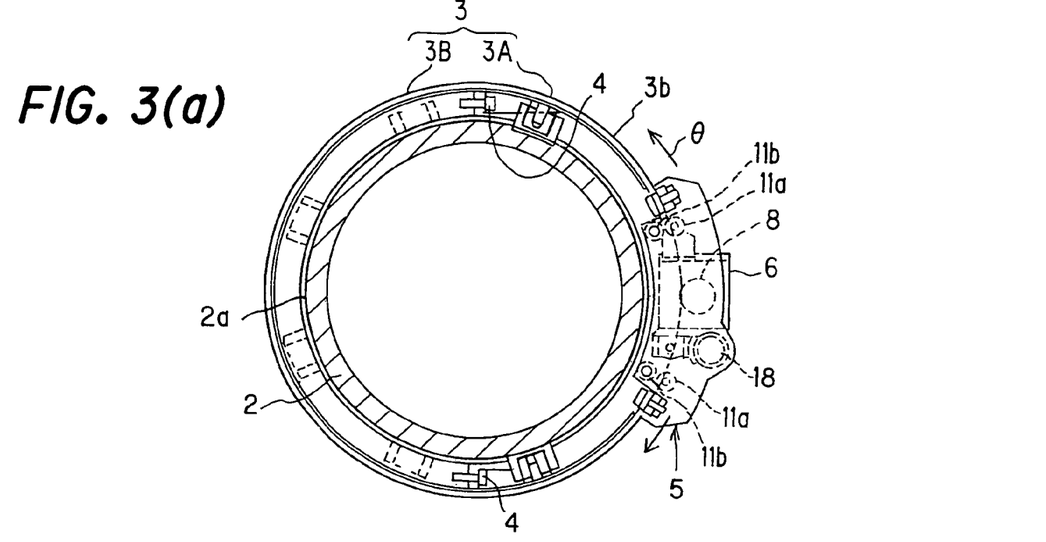
Figure 3B:
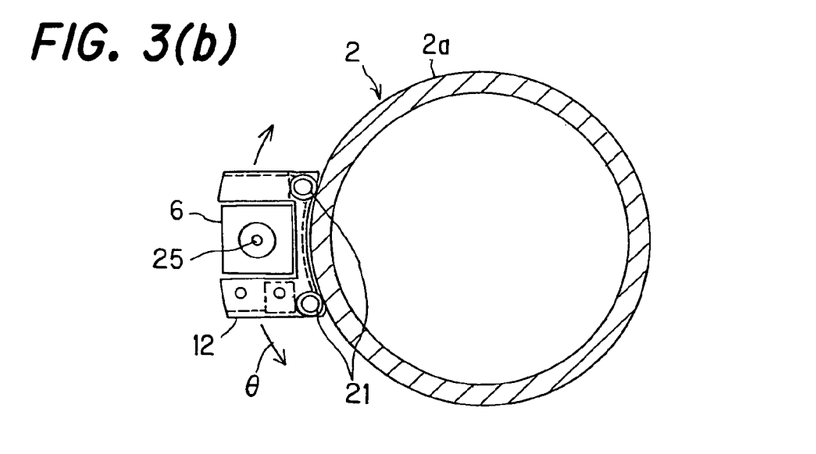
Figure 4A:
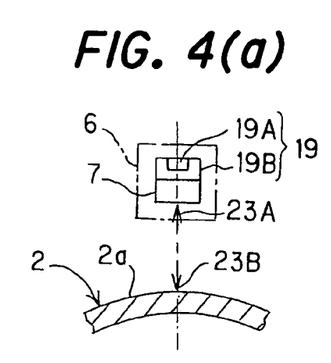
Figure 4B:
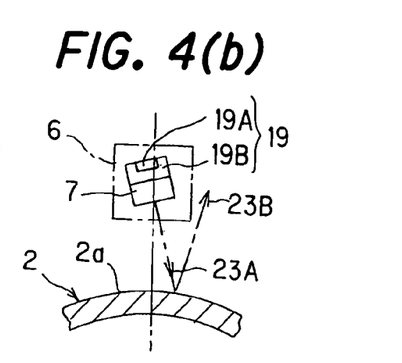
Figure 5A:
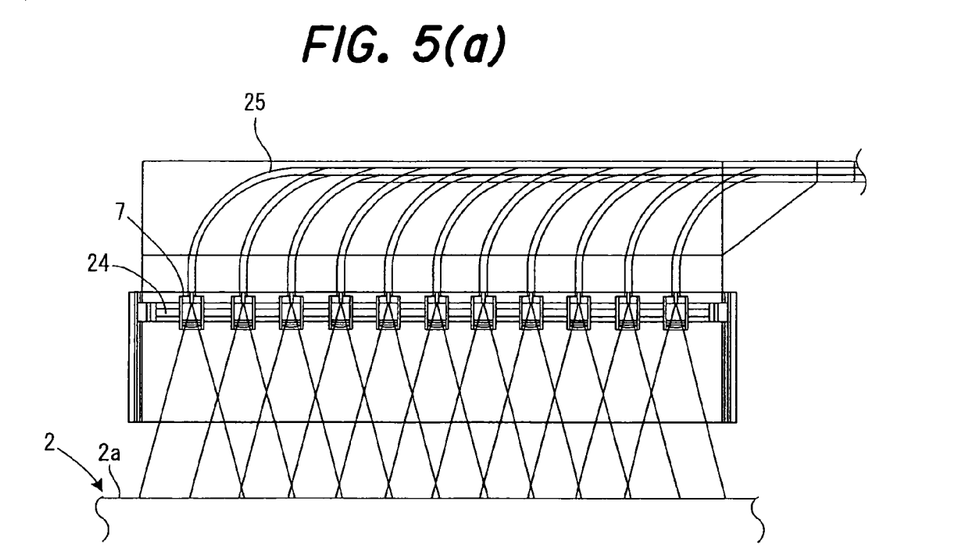
Figure 5B:
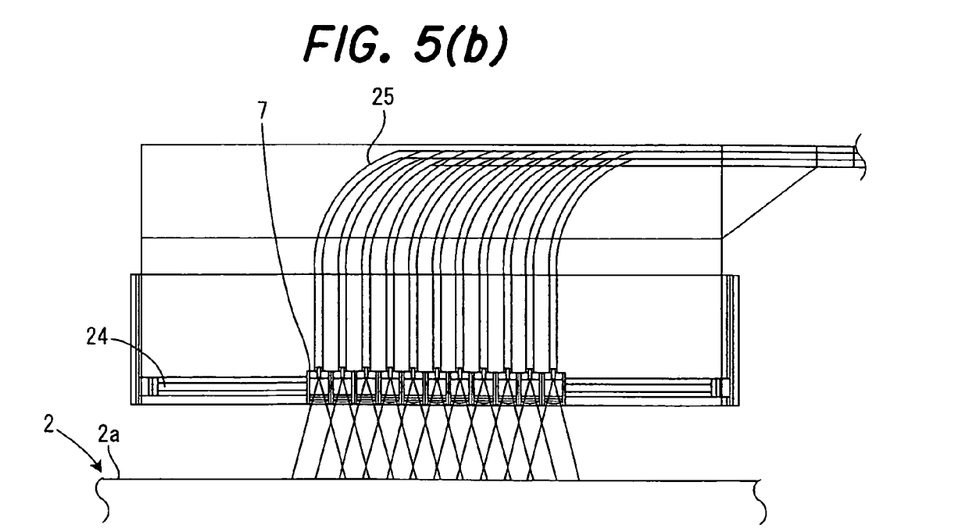

FIG. 1 is a plan view, partly broken away, showing the configuration of a residual stress improving apparatus for piping according to Embodiment 1 of the present invention. FIG. 2 is a side view (a view taken in the direction of A in FIG. 1), partly broken away, showing the configuration of the residual stress improving apparatus for piping. FIG. 3(a) is a view taken in the direction of B in FIG. 1, and FIG. 3(b) is a view taken in the direction of C in FIG. 1. FIG. 4(a) and FIG. 4(b) are explanation drawings showing the actions and effects of a reflection direction adjusting means provided in the residual stress improving apparatus for piping. FIG. 5(a) and FIG. 5(b) are views showing a configuration example of a multi-type laser head configuration.

A residual stress improving apparatus 1 for piping according to Embodiment 1, shown in FIGS. 1 to 3(a), 3(b), is used to reduce (including eliminate) residual tensile stress generated in the inner peripheral surface of piping 2 as a straight pipe (i.e., piping having only a straight pipe portion) by welding (see a weld zone 26) or the like. This apparatus includes a ring rail 3, a rotational travel bogie 5, and a laser head portion 6 holding a laser head 7.

As shown in FIGS. 1 to 4(a), 4(b), the ring rail 3 is mounted on an outer peripheral surface 2a of the piping 2 to surround the periphery of the piping 2. The ring rail 3 is divided into two semicircular members, a ring rail member 3A and a ring rail member 3B. The ring rails 3A and 3B are coupled by coupling means, such as bolts 4, with the piping 2 being interposed between the ring rail members 3A and 3B, whereby the ring rail 3 is formed in a circular form (annular form)

The rotational travel bogie 5 travels and moves on the ring rail 3, as a track, while engaging the ring rail 3. That is, the rotational travel bogie 5 travels and moves along the outer peripheral surface 2a of the piping 2 in a circumferential direction about a shaft axis 2b (virtual axis) of the piping (straight pipe portion) 2 (i.e., θ-direction: hereinafter referred to simply as the circumferential direction).

In detail, a gear 3b is formed on an outer peripheral surface 3a of the ring rail 3, and a gear 8 supported by bearings 9 is rotatably provided on the rotational travel bogie 5. The gear 3b and the gear 8 are in mesh. The gear 8 is coupled to a rotating shaft of a circumferential direction drive motor 10 provided in the rotational travel bogie 5. Thus, when the circumferential direction drive motor 10 is rotated, the gear 8 is rotated in mesh with the gear 3b and, during this rotation, travels and moves in the circumferential direction along the gear 8. As a result, the whole of the rotational drive bogie 5, together with the gear 8, travels and moves in the circumferential direction.

A pair of circumferential direction guide rollers 11a, 11a and a pair of circumferential direction guide rollers 11b, 11b are rotatably provided at four locations, i.e., two longitudinal locations and two lateral locations with respect to the circumferential direction. These circumferential direction guide rollers 11a and 11b pinch and hold right and left end portions 3c and 3d of the ring rail 3 which are located laterally with respect to the circumferential direction. Thus, the rotational drive bogie 5 can travel and move smoothly in the circumferential direction while being guided by the circumferential direction guide rollers 11a, 11b and the right and left end portions 3c and 3d of the ring rail 3.

The ring rail 3 and the rotational travel bogie 5 mentioned above constitute a circumferential direction moving means for moving the laser head portion 6 in the circumferential direction.

A support frame 12, which is rectangular in a plan view (see FIG. 1) and U-shaped in a front view (see FIG. 3(b)), is provided in a side surface of the rotational travel bogie 5 in the direction of the pipe axis 2b (hereinafter referred to as the pipe axis direction). The laser head portion 6 is in the shape of a rectangular parallelepiped elongated in the pipe axis direction, is disposed in a central portion of the support frame 12, and is provided to be movable in the pipe axis direction. In detail, a linear rail 13 and a ball screw shaft (external thread) 14 are mounted on the support frame 12 parallel to the pipe axis direction. The ball screw 14 is rotatably supported by the support frame 12 via a bearing 15. The linear rail 13 and the ball screw shaft 14 are also disposed to be located on one side and on the other side in the circumferential direction with respect to the laser head portion 6.

Linear bushes 16 are mounted on a side surface of the laser head portion 6 on the above-mentioned one side. The linear bushes 16 are mounted on the linear rail 13 to be slidable in the pipe axis direction. A ball nut (internal thread) 17 is mounted on a side surface of the laser head portion 6 on the above-mentioned other side. The ball nut 17 and the ball screw shaft 14 are screwed to each other. The ball screw shaft 14 is also coupled to a rotating shaft of an axial direction drive motor 18 provided in the rotational travel bogie 5.

Thus, when the ball screw shaft 14 is rotationally driven by the axial direction drive motor 18, the ball nut 17 is moved along the ball screw shaft 14 in the pipe axis direction (Z-direction). As a result, the laser head portion 6, as a whole, is moved together with the ball nut 17 in the pipe axis direction. At this time, the laser head portion 6 is guided by the linear rail 13 and the linear bushes 16, and can thereby be moved smoothly in the pipe axis direction. FIG. 1 shows a state of the laser head portion 6 moving forward in the pipe axis direction by dashed dotted lines.

The above-mentioned axial direction drive motor 18, the ball screw shaft 14, and the ball nut 17 constitute a pipe axis direction moving means for moving the laser head portion 6 along the pipe axis direction.

Rollers 21 are rotatably provided on a front surface, in the pipe axis direction, of the support frame 12, and these rollers 21 are adapted to roll on the outer surface 2a of the piping 2 in the circumferential direction. Thus, when the support frame 12 and the laser head portion 6 supported thereby move together with the rotational travel bogie 55 in the circumferential direction, the rollers 21 support their loads and roll on the outer peripheral surface 2a of the piping 2 in the circumferential direction, whereby the aforementioned movement in the circumferential direction takes place smoothly.

The laser head 7 provided in the laser head portion 6 is connected to a laser oscillation device such as a YAG laser oscillation device (not shown) via an optical fiber 25. Thus, laser light outputted from the laser oscillation device is transmitted to the laser head 7 by the optical fiber 25, then delivered from the laser head 7, and directed at the outer peripheral surface 2a of the piping 2 (for example, directed at a hatched portion in FIG. 2).

The laser head portion 6 is also provided with a stationary portion 19A of a linear motor 19 disposed parallel to the pipe axis direction (the longitudinal direction of the laser head portion 6), and a moving portion 19B of the linear motor 19 moving along the linear motor stationary portion 19A in the pipe axis direction. The laser head 7 is mounted on the linear motor moving portion 19B. Thus, the laser head 7 can be moved in an oscillatory manner by the linear motor 19 in the pipe axis direction (the longitudinal direction of the laser head portion 6: γ-direction)

That is, the above-mentioned linear motor 19 constitutes an oscillating means which moves the laser head 7 in an oscillatory manner along the pipe axis direction. However, this is not necessarily limitative, and the oscillating means may be one which can move the laser head 7 in an oscillatory manner along the pipe axis direction. For example, the aforementioned pipe axis direction moving means may be used as the oscillating means.

A rotating shaft of a tilt drive motor 22 provided in the laser head portion 6 is coupled to the linear motor stationary portion 19A. Thus, when the linear motor stationary portion 19A is pivoted by the tilt drive motor 22, the laser head 7 is pivoted, together with the linear motor moving portion 19B, about the linear motor stationary portion 19A as a pivot shaft (pivoted in a β-direction), whereby the laser head 7 is tilted rightward or leftward with respect to the pipe axis direction. At this time, the linear motor stationary portion 19A is parallel to the pipe axis direction. Thus, the orientation of the laser head 7 is adjusted in a plane (virtual plane) orthogonal to the pipe axis 2b, whereby the direction of delivery of laser light delivered from the laser head 7 is adjusted in this plane.

That is, the tilt drive motor 22 and the linear motor 19 mentioned above adjust the orientation of the laser head 6 in the plane orthogonal to the pipe axis 2b to adjust the direction of delivery of laser light in the plane orthogonal to the pipe axis 2b, thereby adjusting the direction of reflection of laser light so that the laser light reflected by the outer peripheral surface 2a of the piping 2 does not return to the laser head 7. The tilt drive motor 22 and the linear motor 19, making these adjustments, constitute a reflection direction adjusting means.

For example, if the orientation of the laser head 7 (the direction of delivery of laser light 23A) is not adjusted by the reflection direction adjusting means as shown in FIG. 4(a), reflected light 23B of the laser light 23A reflected by the outer peripheral surface 2a of the piping 2 returns to the laser head 7. By contrast, if the orientation of the laser head 7 (the direction of delivery of the laser light 23A) is adjusted by the reflection direction adjusting means as shown in FIG. 4(b), the reflected light 23B of the laser light 23A reflected by the outer peripheral surface 2a of the piping 2 can be caused not to return to the laser head 7.

The adjustment is not necessarily limited to the case where the orientation of the laser head 7 (the direction of delivery of the laser light) is adjusted in the plane orthogonal to the pipe axis 2b. The adjustment may be such that the orientation of the laser head 7 (the direction of delivery of the laser light 23A) is adjusted in a plane (virtual plane) intersecting the pipe axis 2b so that the reflected light 23B does not return to the laser head 7.

The adjustment is not necessarily limited to the case where the direction of reflection can be adjusted by the reflection direction adjusting means. The adjustment may be made in a stationary manner. That is, it is permissible to adopt a feature in which the orientation of the laser head 6 is adjusted beforehand in the plane orthogonal to (may be intersecting) the pipe axis 2b to adjust the direction of delivery of the laser light 23A in the plane orthogonal to (may be intersecting) the pipe axis 2b so that the laser light reflected by the outer peripheral surface 2a of the piping 2 does not return to the laser head 7.

In the above-described configuration, the laser head 7 provided in the laser head portion 6 is of the oscillating type. However, this is not limitative, and there may be adopted a multi-type configuration in which a plurality of the laser heads 7 provided in the laser head portion 6 are arranged along the pipe axis direction. In a multi-type configuration as shown in FIGS. 5(a), 5(b), for example, a plurality of (eleven in the illustrated example) the laser heads 7 are slidably provided on a slide member 24 provided in the laser head portion 6 parallel to the pipe axis direction (the longitudinal direction of the laser head portion 6). Each laser head 7 is connected to the laser oscillation device (not shown) via the optical fiber 25 for transmitting the laser light 23A. The spacing between the plurality of laser heads 7 can be adjusted as appropriate, such as increased as shown in FIG. 5(a), or decreased as shown in FIG. 5(b), by sliding the laser heads 7 along the slide member 24.

In the above multi-type configuration, if the laser heads 7 are to be moved (pivoted) in the β-direction, it is permissible to pivot a shaft (e.g., slide member 24) common to the plurality of laser heads 7 by reflection direction adjusting means (pivoting means), such as a tilt drive motor, to pivot all the laser heads 7 simultaneously. Alternatively, reflection direction adjusting means (pivoting means), such as a tilt drive motor, may be provided individually for each laser head 7, and each laser head 7 may be pivoted individually.

The positions of movement and the positions of pivoting in the θ-, Z-, γ- and β-directions are controlled to become predetermined positions with respect to the outer peripheral surface 2a of the piping 2 by a drive control device based on position detection signals of position sensors, such as a rotary encoder and a linear encoder, which detect these positions of movement and these positions of pivoting, although relevant illustrations are omitted. The drive control device also controls the output of the laser light 23A emitted from the laser oscillation device, which in turn controls the irradiation intensity of the laser light 23A delivered from the laser head 7 and directed at the outer peripheral surface 2a of the piping 2.

As described above, the residual stress improving apparatus 1 for piping according to the present Embodiment 1 is characterized by including the laser head portion 6 for holding the one or plurality of laser heads 7 delivering the laser light 23A, and the circumferential direction moving means (ring rail 3, rotational travel bogie 5) for moving the laser head 7, together with the laser head portion 6, along the circumferential direction about the pipe axis 2b along the outer peripheral surface of the piping 2 (straight pipe portion). Thus, the residual stress of the piping 2 can be reduced (eliminated) by heating the outer peripheral surface 2a of the piping 2 with the laser light 23A. Moreover, compared with the conventional apparatus, the configuration of the present apparatus is compact. Thus, this apparatus can be installed and operated in a relatively narrow, limited space at a decreased cost.

Furthermore, the residual stress improving apparatus 1 for piping according to the present Embodiment 1 is characterized in that the orientation of the laser head 7 is adjusted in the plane intersecting the pipe axis 2b to adjust the direction of delivery of the laser light 23A in the same plane so that the laser light 23A reflected by the outer peripheral surface 2a of the piping 2 (i.e., reflected light 23B) does not return to the laser head 7. Thus, the laser head 7 (lenses provided in the laser head 7) can be prevented from being damaged by the reflection of the laser light 23A.

The residual stress improving apparatus 1 for piping according to the present Embodiment 1, in particular, is characterized by having the reflection direction adjusting means (tilt drive motor 22, linear motor 19). The direction of reflection of the laser light 23A can be adjusted by this reflection direction adjusting means. Thus, damage to the laser head 7 (lenses provided in the laser head 7) due to the reflection of the laser light 23A can be prevented more reliably.

Embodiment 2

Figure 6:
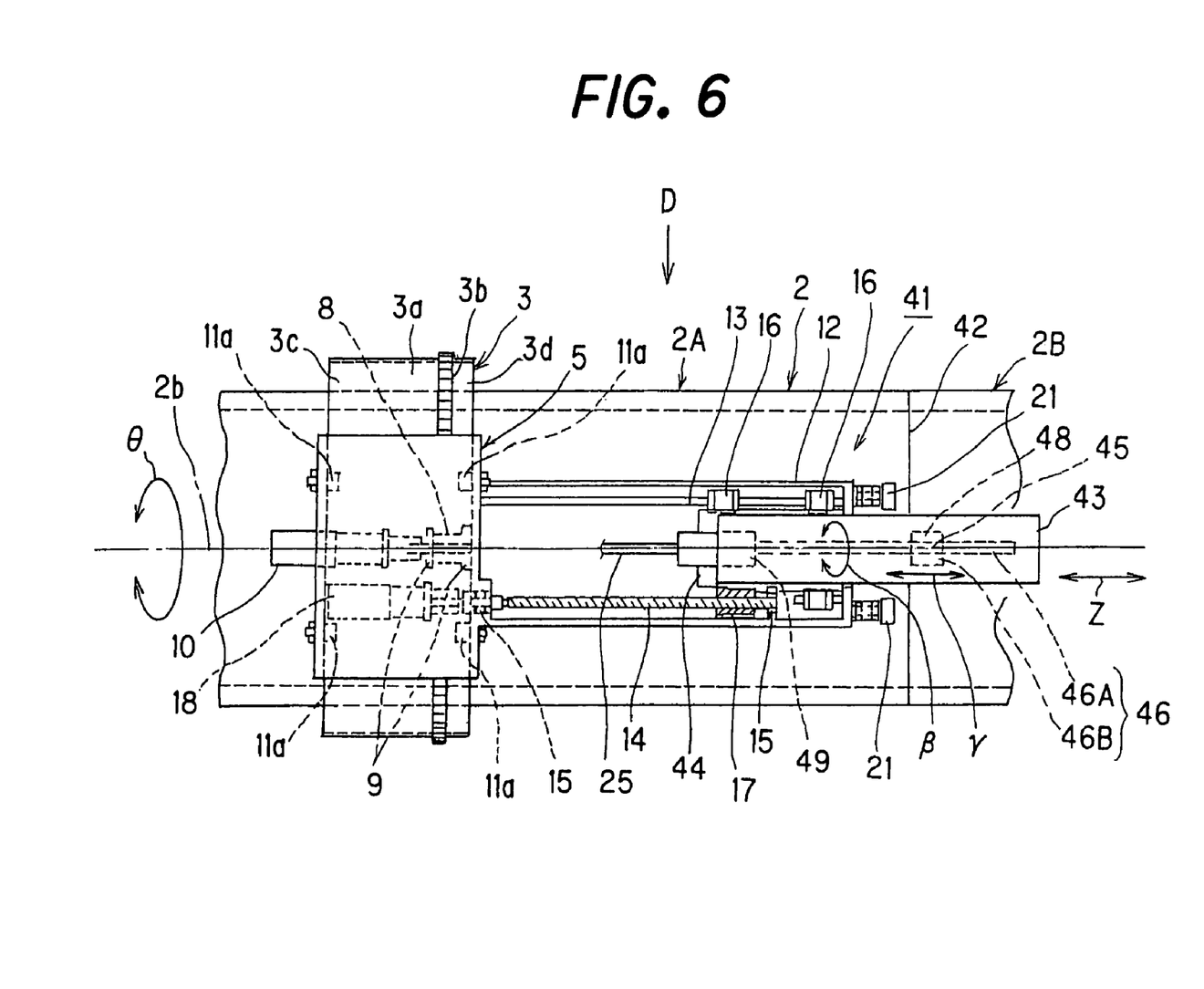
[FIG. 6] is a plan view, partly broken away, showing the configuration of a residual stress improving apparatus for piping according to Embodiment 2 of the present invention.
Figure 7:
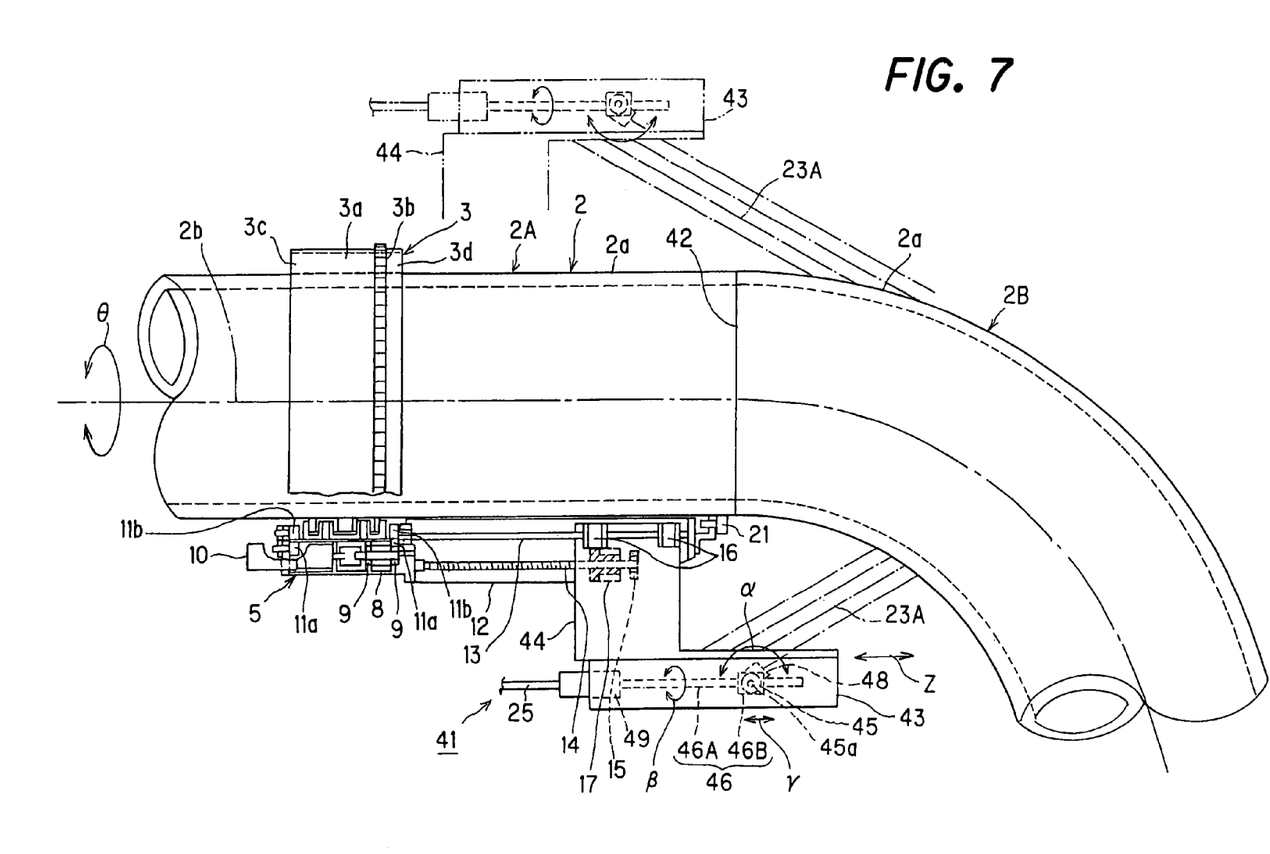
[FIG. 7] is a side view (a view taken in the direction of D in FIG. 6), partly broken away, showing the configuration of the residual stress improving apparatus for piping.

FIG. 6 is a plan view, partly broken away, showing the configuration of a residual stress improving apparatus for piping according to Embodiment 2 of the present invention. FIG. 7 is a side view (a view taken in the direction of D in FIG. 6), partly broken away, showing the configuration of the residual stress improving apparatus for piping. In these drawings, the same portions as those in the above Embodiment 1 (see FIGS. 1 to 4(a), 4(b)) are assigned the same numerals as those in the Embodiment 1, and detailed descriptions of these portions are omitted.

A residual stress improving apparatus 41 for piping according to the present Embodiment 2 shown in FIGS. 6 and 7 is an apparatus preferred for use in reducing (including eliminating) residual tensile stress generated in piping 2 having a straight pipe portion 2A and an L-shaped (arcuate) bending pipe portion (elbow pipe portion) 2B continued from the straight pipe portion 2A, particularly, the stress generated in the inner peripheral surface of the bending pipe portion 2B by welding (see a weld zone 42) or the like. However, the present residual stress improving apparatus 41 for piping can not only reduce the residual stress of the bending pipe portion 2B, but can also reduce the residual stress of the straight pipe portion 2A.

As shown in FIGS. 6 and 7, a ring rail 3 in the present residual stress improving apparatus 41 for piping is mounted on an outer peripheral surface 2a of the straight pipe portion 2A in the vicinity of the bending pipe portion 2A, as in the case of the Embodiment 1.

The present residual stress improving apparatus 41 for piping is furnished with a laser head portion 43, and a support member 44 for supporting the laser head portion 43, in place of the laser head portion 6 in the aforementioned residual stress improving apparatus 1 for piping in the Embodiment 1. In the Embodiment 1, the laser head portion 6 is disposed in the central portion of the support frame 12 (see FIG. 1). In the present Embodiment 2, the laser head portion 43 is disposed at a position remote from the support frame 12, namely, at a position remote from the piping 2 as compared with the Embodiment 1. The support member 44 is disposed in a central portion of the support frame 12.

Thus, a linear rail 13 and a ball screw shaft 14 are disposed to be located on one side and on the other side in a circumferential direction about a shaft axis 2b (virtual axis) of the straight pipe portion 2A of the piping 2 (i.e., θ-direction: hereinafter referred to simply as the circumferential direction) with respect to the support member 44. Linear bushes 16 are mounted on a side surface of the support member 44 on the above-mentioned one side. A ball nut 17 is mounted on a side surface of the support member 44 on the above-mentioned other side.

The support member 44 is an L-shaped member having a predetermined length in the diametrical direction of the straight pipe portion 2A of the piping 2, and having a bending front end portion. The laser head portion 44 is mounted on the front end portion of the support member 44, whereby the distance between the laser head portion 43 and the outer peripheral surface 2a of the piping 2, accordingly, the distance between a laser head 45 held in the laser head portion 44 and the outer peripheral surface 2a of the piping 2, is set at a predetermined distance. This predetermined distance may be set, as appropriate, depending on the diameter of the piping 2, the orientation of the laser head 45 to be described later (direction of delivery of laser light 23A), and the position of irradiation with laser light on the outer peripheral surface 2a of the bending pipe portion 2B.

The laser head portion 43 is of a rectangular parallelepipedal shape elongated in the pipe axis direction. The laser head 48 provided in the laser head portion 43 is connected to a laser oscillation device such as a YAG laser oscillation device (not shown) via an optical fiber 25. Thus, laser light 23A outputted from the laser oscillation device is transmitted to the laser head 48 by the optical fiber 25, then delivered from the laser head 48, and directed at the outer peripheral surface 2a of the bending pipe portion 2B.

The laser head 48 provided in the laser head portion 43 is of an oscillating type. That is, the laser head portion 43 is provided with a stationary portion 46A of a linear motor 46 disposed parallel to the direction of a pipe axis 2b (hereinafter referred to simply as the pipe axis direction) (i.e., parallel to the longitudinal direction of the laser head portion 43), and a moving portion 46B of the linear motor 46 moving along the linear motor stationary portion 46A in the pipe axis direction. The laser head 48 is mounted on the linear motor moving portion 46B via a tilt drive motor 45.

Thus, the laser head 48 can be moved in an oscillatory manner, together with the tilt drive motor 45, by the linear motor 46 in the pipe axis direction (the longitudinal direction of the laser head portion 43: γ-direction). That is, the above-mentioned linear motor 46 constitutes an oscillating means which moves the laser head 48 in an oscillatory manner along the pipe axis direction. However, this is not necessarily limitative, and the oscillating means may be one which can move the laser head 48 in an oscillatory manner along the pipe axis direction. For example, the pipe axis direction moving means, which is composed of the axial direction drive motor 18, the ball screw shaft 14, and the ball nut 17, can be used as the oscillating means.

Furthermore, the laser head 48 is adapted to be pivoted in an α-direction by the tilt drive motor 45. That is, the axial direction of a rotating shaft 45a of the tilt drive motor 45 is orthogonal to a plane (virtual plane) including the shaft axis 2b, and the laser head 48 is pivoted (pivoted in the α-direction) about the rotating shaft 45a as a pivot shaft. As a result, the orientation of the laser head 48 is rendered toward a forward side in the pipe axis direction (toward the bending pipe portion) so that laser light 23A emitted from the laser head 48 can be oriented toward the forward side in the pipe axis direction. Thus, the laser light 23A can be shone onto the outer peripheral surface 2a of the bending pipe portion 2B which is located forwardly, in the pipe axis direction, of the laser head portion 43 (laser head 48).

That is, the tilt drive motor 45 mentioned above adjusts the orientation of the laser head 48 in the plane (virtual plane) including the pipe axis 2b to adjust the direction of delivery of the laser light 23A in the same plane, thereby adjusting the direction of delivery of the laser light 23A so that the laser light 23A is shone onto the outer peripheral surface 2a of the bending pipe portion 2B located forwardly, in the pipe axis direction, of the laser head 48. Thus, the tilt drive motor 45 constitutes a delivery direction adjusting means for adjusting the direction of delivery of the laser light 23A.

The adjustment is not necessarily limited to the case where the direction of delivery of the laser light 23A can be adjusted by the delivery direction adjusting means. The adjustment may be made in a stationary manner. That is, it is permissible to adopt a feature in which the orientation of the laser head 48 is adjusted beforehand in the plane including the pipe axis 2b to adjust the direction of delivery of the laser light 23A in the same plane so that the laser light 23A is shone onto the outer peripheral surface 2a of the bending pipe portion 2B located forwardly, in the pipe axis direction, of the laser head 48.

A rotating shaft of a tilt drive motor 49 provided in the laser head portion 43 is coupled to the linear motor stationary portion 46A. Thus, when the linear motor stationary portion 46A is pivoted by the tilt drive motor 49, the laser head 48 is pivoted, together with the linear motor moving portion 46B, about the linear motor stationary portion 46A as a pivot shaft (pivoted in a β-direction), whereby the laser head 48 is tilted rightward or leftward with respect to the pipe axis direction. At this time, the linear motor stationary portion 46A is parallel to the pipe axis direction. Thus, the orientation of the laser head 48 is adjusted in a plane (virtual plane) orthogonal to the pipe axis 2b, whereby the direction of delivery of the laser light 23A delivered from the laser head 48 is adjusted in this plane.

That is, the tilt drive motor 49 and the linear motor 46 mentioned above adjust the orientation of the laser head 48 in the plane orthogonal to (may be intersecting) the pipe axis 2b to adjust the direction of delivery of the laser light 23A in the same plane, thereby adjusting the direction of reflection of the laser light 23A so that the laser light 23A reflected by the outer peripheral surface 2a of the piping 2 does not return to the laser head 7. The tilt drive motor 49 and the linear motor 46, making these adjustments, constitute a reflection direction adjusting means.

Such a reflection direction adjusting means is effective, particularly, for shining the laser light 23A onto the outer peripheral surface 2*a* of the direct pipe portion 2A. That is, if the laser light 23A is shone without tilting the laser head 48 forwardly in the pipe axis direction by the tilt drive motor 45 when the laser light 23A is shone onto the outer peripheral surface 2*a* of the straight pipe portion 2A, the direction of delivery of the laser light 23A is adjusted by the reflection direction adjusting means, whereby the reflected light of the laser light 23A can be prevented from returning to the laser head 48 (see FIGS. 4(*a*), 4(*b*)).

The adjustment is not necessarily limited to the case where the direction of reflection can be adjusted by the reflection direction adjusting means. The adjustment may be made in a stationary manner. That is, it is permissible to adopt a feature in which the orientation of the laser head 48 is adjusted beforehand in the plane orthogonal to (may be intersecting) the pipe axis 2*b* to adjust the direction of delivery of the laser light 23A in the same plane so that the laser light 23A reflected by the outer peripheral surface 2*a* of the straight pipe portion 2A does not return to the laser head 48.

In the above-described configuration, the laser head 48 provided in the laser head portion 43 is of the oscillating type. However, this is not limitative, and there may be adopted a multi-type configuration in which a plurality of the laser heads 48 provided in the laser head portion 43 are arranged along the pipe axis direction. For example, the aforementioned multi-type configuration shown in FIGS. 5(*a*), 5(*b*) may be used. In FIGS. 5(*a*), 5(*b*), the laser heads 6 should be replaced by the laser heads 48.

In the above multi-type configuration, if the laser heads 48 are to be moved (pivoted) in the β-direction, it is permissible to pivot a shaft (e.g., slide member 24) common to the plurality of laser heads 48 by reflection direction adjusting means (pivoting means), such as a tilt drive motor, to pivot all the laser heads 48 simultaneously. Alternatively, reflection direction adjusting means (pivoting means), such as a tilt drive motor, may be provided individually for each laser head 48, and each laser head 48 may be pivoted individually.

In the above multi-type configuration, if the laser heads 48 are to be moved (pivoted) in the α-direction, it is permissible to provide the tilt drive motor 45 for each laser head 48, and move (pivot) each laser head 48 individually. Alternatively, the laser heads 48 provided to be pivotable may all be coupled by a suitable coupling means, and all of the laser heads 48 may be moved (pivoted) simultaneously, for example, by a single tilt drive motor 45.

The positions of movement and the positions of pivoting in the θ-, Z-, γ-, β- and α-directions are controlled to become predetermined positions with respect to the outer peripheral surface 2*a* of the piping 2 (straight pipe portion 22A, bending pipe portion 22B) by a drive control device based on position detection signals of position sensors, such as a rotary encoder and a linear encoder, which detect these positions of movement and these positions of pivoting, although relevant illustrations are omitted. The drive control device also controls the output of the laser light 23A emitted from the laser oscillation device, which in turn controls the irradiation intensity of the laser light 23A delivered from the laser head 48 and directed at the outer peripheral surface 2*a* of the piping 2.

Particularly when the outer peripheral surface 2*a* of the bending pipe portion 2B is irradiated with the laser light 23A, if the laser light 23A is thrown obliquely from different positions in the pipe axis direction as shown in FIG. 7, the distance of irradiation with the laser light 23A differs between a rearward side in the pipe axis direction (i.e., a side in the direction of the straight pipe portion) and a forward side in the pipe axis direction (a side in the direction of the bending pipe portion). Thus, the intensity of irradiation at different positions of the outer peripheral surface 2*a* of the bending pipe portion 2B may be different.

According to the drive control device as the output adjusting means, therefore, the output of the laser light 23A emitted from the laser oscillation device is adjusted to provide a uniform irradiation intensity at the different positions. That is, if the laser head 48 is of the oscillating type, the output of the laser light 23A emitted from the laser oscillation device is adjusted such that the laser light 23A delivered from the laser head 48 at different oscillating positions of the laser head 48 attains a uniform irradiation intensity on the outer peripheral surface 2*a* of the bending pipe portion 2B. In the case of a multi-type configuration of the laser heads 48, the output of the laser light 23A from each laser oscillation device is adjusted such that the laser light 23A delivered from each of the plurality of laser heads 48 attains a uniform irradiation intensity on the outer peripheral surface 2*a* of the bending pipe portion 2B.

With the drive control device, moreover, the pipe axis direction moving means composed of the axial direction drive motor 18, etc. is controlled to adjust the position, in the pipe axis direction, of the laser head portion 43 (laser head 48), thereby adjusting the irradiation position of the laser light 23A when shone onto the outer peripheral surface 2*a* on the ventral side of the bending pipe portion 2B (i.e., the side with a smaller radius of curvature; lower side in FIG. 7), or the irradiation position of the laser light 23A when shone onto the outer peripheral surface 2*a* on the dorsal side of the bending pipe portion 2B (i.e., the side with a larger radius of curvature; upper side in FIG. 7).

According to the residual stress improving apparatus 41 for piping of the present Embodiment 2, as described above, the following actions and effects are obtained, in addition to the same actions and effects as those in the residual stress improving apparatus 1 for piping of the aforementioned Embodiment 1.

That is, the residual stress improving apparatus 41 for piping according to the present Embodiment 2 is characterized in that the orientation of the laser head 48 is adjusted in the plane including the pipe axis 2*a* to adjust the direction of delivery of the laser light 23A in the same plane so that the laser light 23A is shone onto the outer peripheral surface 2*a* of the bending pipe portion 2B located forwardly, in the pipe axis direction, of the laser head 48. Thus, the outer peripheral surface 2*a* of the bending pipe portion 2B can be irradiated with the laser light 23A, so that the residual stress of the bending pipe portion 2B can be reduced (eliminated). That is, a residual stress improving apparatus for piping, which is preferred for the bending pipe portion 2B, can be achieved.

The residual stress improving apparatus 41 for piping according to the present Embodiment 2, in particular, is characterized by having the delivery direction adjusting means (tilt drive motor 45). This delivery direction adjusting means can adjust the direction of delivery of the laser light 23A. Thus, the outer peripheral surface 2*a* of the bending pipe portion 2B can be irradiated with the laser light 23A more reliably, so that the residual stress of the bending pipe portion 2B can be reduced (eliminated) more reliably. That is, a residual stress improving apparatus for piping, which is more preferred for the bending pipe portion 2B, can be achieved.

The residual stress improving apparatus 41 for piping according to the present Embodiment 2, moreover, is characterized by having the pipe axis direction moving means (axial direction drive motor 18, ball screw shaft 14, ball nut 17). This pipe axis direction moving means moves the laser head portion 43 in the pipe axis direction, whereby the position of irradiation with the laser light 23A on the outer peripheral surface of the bending pipe portion 2B can be adjusted as appropriate. Thus, the outer peripheral surface 2*a* on the ventral side of the bending pipe portion 2B and the outer peripheral surface 2 on the dorsal side of the bending pipe portion 2B, for example, can be irradiated with the laser light 23A reliably.

The residual stress improving apparatus 41 for piping according to the present Embodiment 2, moreover, is characterized by having the output adjusting means (drive control device). This output adjusting means can uniformize the irradiation intensity, on the outer peripheral surface 2*a* of the bending pipe portion 2B, of the laser light 23A delivered from the laser head 48 (oscillating type) at each of different oscillating positions. Thus, the outer peripheral surface 2*a* of the bending pipe portion 2B can be heated with the laser light 23A more properly and efficiently.

Alternatively, the residual stress improving apparatus 41 for piping according to the present Embodiment 2 is characterized by having the output adjusting means (drive control device). This output adjusting means can uniformize the irradiation intensity, on the outer peripheral surface 2*a* of the bending pipe portion 2B, of the laser light 23A delivered from each of the plurality of laser heads 48 (multi-type configuration). Thus, the outer peripheral surface 2*a* of the bending pipe portion 2B can be heated with the laser light 23A more properly and efficiently.

Embodiment 3

Figure 8:
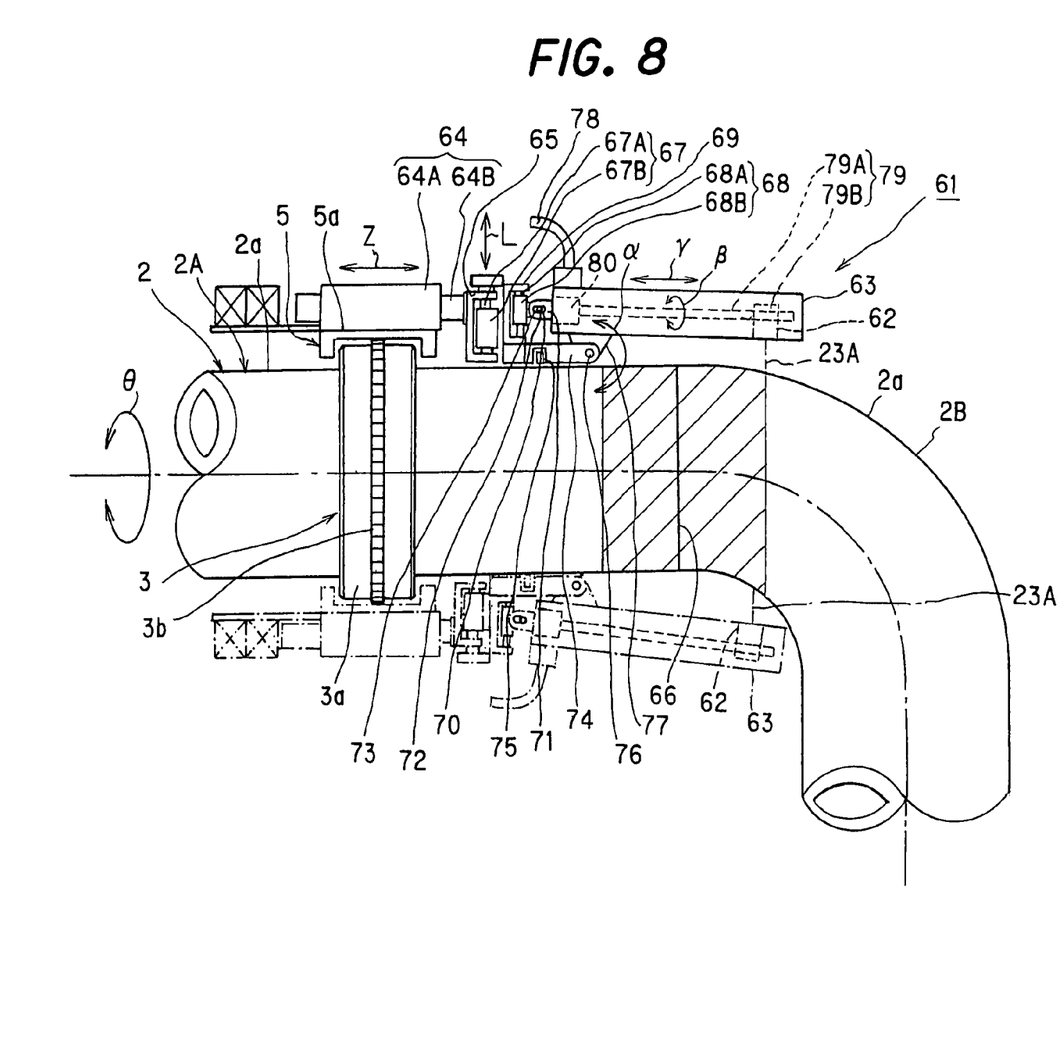
[FIG. 8] is a side view showing the configuration of a residual stress improving apparatus for piping according to Embodiment 3 of the present invention.

FIG. 8 is a side view showing the configuration of a residual stress improving apparatus for piping according to Embodiment 3 of the present invention.

A residual stress improving apparatus 61 for piping according to the present Embodiment 3 shown in FIG. 8 is an apparatus preferred for use in reducing (including eliminating) residual tensile stress generated in piping 2 having a straight pipe portion 2A and an L-shaped (arcuate) bending pipe portion (elbow pipe portion) 2B continued from the straight pipe portion 2A, particularly, the stress generated in the inner peripheral surface of the bending pipe portion 2B, by welding (see a weld zone 66) or the like. However, the present residual stress improving apparatus 61 for piping can not only reduce the residual stress of the bending pipe portion 2B, but can also reduce the residual stress of the straight pipe portion 2A.

As shown in FIG. 8, the residual stress improving apparatus 61 for piping includes a ring rail 3, a rotational travel bogie 5, and a laser head portion 63 holding a laser head 62.

The ring rail 3 is mounted on an outer peripheral surface 2*a* of the straight pipe portion 2A, in the vicinity of the bending pipe portion 2B, to surround the periphery of the straight pipe portion 2A. The rotational travel bogie 5 travels along the circumferential surface of the ring rail 3. That is, the rotational travel bogie 5 travels on the ring rail 3, as a track, while engaging the ring rail 3, thereby traveling and moving along the outer peripheral surface 2*a* of the straight pipe portion 2A in a circumferential direction about a shaft axis 2*b* (virtual axis) of the straight pipe portion 2A (i.e., θ-direction: hereinafter referred to simply as the circumferential direction). A gear 3*b* is formed on an outer peripheral surface 3*a* of the ring rail 3, and the gear 3*b* is in mesh with a gear (not shown) provided in the rotational travel bogie 5. The concrete configurations of the ring rail 3 and the rotational travel bogie 5 are the same as those of the ring rail 3 and the rotational travel bogie 5 in the aforementioned Embodiment 1. Thus, their illustrations and detailed descriptions are omitted here.

The ring rail 3 and the rotational travel bogie 5 mentioned above constitute a circumferential direction moving means for moving the laser head portion 63 in the circumferential direction.

On a rearward side, in the direction of the pipe axis 2*b* (hereinafter referred to simply as the pipe axis direction), of the rotational travel bogie 5, a balance weight 64 is provided for ensuring a weight balance with the laser head portion 63 provided on a forward side, in the pipe axis direction, of the rotational travel bogie 5 (i.e., a side toward the bending pipe portion).

A linear motor 64 is mounted on the rotational travel bogie 5. The linear motor 64 is composed of a linear motor stationary portion 64A fixed to an outer peripheral surface 5*a* of the rotational travel bogie 5, and a linear motor moving portion 64B, as a longitudinal (pipe axis direction) slide, which moves in the pipe axis direction along the linear motor stationary portion 64A. That is, the linear motor 64 constitutes a pipe axis direction moving means for moving the laser head portion 63 (laser head 62) along the pipe axis direction (Z-direction).

A support member 65, of a U-shape in a side view, is connected to a front end portion of the linear motor moving portion 64B, and a linear motor 67 is mounted on the support member 65. A stationary portion 67A of the linear motor 67 is fixed to the support member 65 such that the longitudinal direction of the stationary portion 67A is along the radial direction of the straight pipe portion 2A (hereinafter referred to simply as the radial direction). A moving portion 67B of the linear motor 67 moves in the radial direction (L-direction) along the linear motor stationary portion 67B. That is, the linear motor 64 constitutes a diametrical direction moving means for moving the laser head portion 63 (laser head 62) in the radial direction (L-direction).

Moreover, a support member 69, of a U-shape in a side view, is connected to the linear motor moving portion 67B, and a linear motor 68 is mounted on the support member 69. A stationary portion 68A of the linear motor 68 is fixed to the support member 69 such that the longitudinal direction of the stationary portion 68A is along the radial direction. A moving portion 68B of the linear motor 68 moves in the radial direction (L-direction) along the linear motor stationary portion 68B.

The laser head portion 63 is of a rectangular parallelepipedal shape elongated in the pipe axis direction. A coupling portion 71, in which a slot 70 elongated in the pipe axis direction has been formed, is provided protrusively at an end portion on a rearward side in the pipe axis direction (i.e., a side in the direction of the straight pipe portion) of the laser head portion 63. A coupling portion 73 having a coupling shaft 72 is provided protrusively at the linear motor moving portion 68B. The coupling shaft 72 is inserted through the slot 70 to be slidable in the longitudinal direction of the slot 70, whereby the linear motor moving portion 68B (coupling portion 73) and the laser head portion 63 (coupling portion 71) are connected together.

A coupling member 74 extending along the pipe axis direction up to the laser head portion 6 is connected to a surface of the support member 69 facing the straight pipe portion 2A. A guide roller 75 rolling along the circumferential direction on the outer peripheral surface 2*a* of the straight pipe portion 2A is rotatably provided midway through the coupling member 74. A coupling portion 77 provided protrusively on a surface of the laser head portion 63 facing the straight pipe portion 2A is coupled via a pivot shaft 76 to an end portion of the coupling member 74 located on a forward side in the pipe axis direction. The pivot shaft 76 (coupling portion 77) is located on a rearward side (base end side), in the pipe axis direction, of the laser head portion 63.

Thus, when the linear motor moving portion 68B moves in the radial direction along the linear motor stationary portion 68A, the laser head portion 63 pivots about a pivot center which is the pivot shaft 76 located on the base end side of the laser head portion 63 (i.e., pivots in an α-direction). As a result, the forward side (front end side), in the pipe axis direction, of the laser head portion 63 approaches or separates from the outer peripheral surface 2b of the bending pipe portion 2B. In this case, the pivot shaft 76 has its axial direction orthogonal to a plane (virtual plane) including the pipe axis 2b, so that the laser head portion 63 pivots in the plane including the pipe axis 2b.

That is, the linear motor 68, the coupling shaft 72 of the coupling portion 71, the slot 70 of the coupling portion 71, the coupling member 74, and the pivot shaft 76 of the coupling portion 77, which have been mentioned above, constitute a pivoting means for pivoting the laser head portion 63 in the plane, including the pipe axis 2b, about the pivot center, which is the pivot shaft 76 located on the rearward side in the pipe axis direction of the laser head portion 63, thereby bringing the forward side in the pipe axis direction of the laser head portion 63 (the side toward the bending pipe portion) close to and away from the outer peripheral surface 2b of the bending pipe portion 2A.

The laser head 62 provided in the laser head portion 63 is connected to a laser oscillation device such as a YAG laser oscillation device (not shown) via an optical fiber 78. Thus, laser light 23A outputted from the laser oscillation device is transmitted to the laser head 62 by the optical fiber 78, then delivered from the laser head 62, and directed at the outer peripheral surface 2a of the bending pipe portion 2A (for example, directed at a hatched portion in FIG. 8).

The laser head portion 63 is also provided with a stationary portion 79A of a linear motor 79 disposed parallel to the longitudinal direction of the laser head portion 63, and a moving portion 79B of the linear motor 79 moving along the linear motor stationary portion 79A in the above longitudinal direction. The laser head 62 is mounted on the linear motor moving portion 79B. Thus, the laser head 62 can be moved in an oscillatory manner by the linear motor 79 in the longitudinal direction (γ-direction).

That is, the above-mentioned linear motor 79 constitutes an oscillating means which moves the laser head 62 in an oscillatory manner along the longitudinal direction.

A rotating shaft of a tilt drive motor 80 provided in the laser head portion 63 is coupled to the linear motor stationary portion 79A. Thus, when the linear motor stationary portion 79A is pivoted by the tilt drive motor 80, the laser head 62 is pivoted, together with the linear motor moving portion 79B, about the linear motor stationary portion 79A as a pivot shaft (pivoted in a β-direction), whereby the laser head 62 is tilted rightward or leftward with respect to the pipe axis direction.

If, at this time, the linear motor stationary portion 79A is parallel to the pipe axis direction, with the laser head portion 63 not being pivoted by the pivoting means, the orientation of the laser head 62 is adjusted in a plane (virtual plane) orthogonal to the pipe axis 2b, whereby the direction of delivery of the laser light 23A delivered from the laser head 62 is adjusted in this plane. If the laser head portion 63 is pivoted by the pivoting means, the orientation of the laser head 62 is adjusted in a plane (virtual plane) intersecting the pipe axis 2b, whereby the direction of delivery of the laser light 23A delivered from the laser head 62 is adjusted in the same plane. In either case, the tilt drive motor 80 and the linear motor 79 mentioned above constitute a reflection direction adjusting means which adjusts the orientation of the laser head 62 in the plane intersecting (including orthogonal to) the pipe axis 2b to adjust the direction of delivery of the laser light 23A in the same plane, thereby adjusting the direction of reflection of the laser light 23A so that the laser light 23A reflected by the outer peripheral surface 2a of the piping 2 (straight pipe portion 2A, bending pipe portion 2B) does not return to the laser head 62 (see FIGS. 4(*a*), 4(*b*)).

The adjustment is not necessarily limited to the case where the direction of reflection can be adjusted by the reflection direction adjusting means. The adjustment may be made in a stationary manner. That is, it is permissible to adopt a feature in which the orientation of the laser head 63 is adjusted beforehand in the plane intersecting the pipe axis 2b to adjust the direction of delivery of the laser light 23A in the same plane so that the laser light 23A reflected by the outer peripheral surface 2a of the piping 2 does not return to the laser head 62.

In the above-described configuration, the laser head 62 provided in the laser head portion 63 is of the oscillating type. However, this is not limitative, and there may be adopted a multi-type configuration in which a plurality of the laser heads 62 provided in the laser head portion 63 are arranged along the pipe axis direction. For example, the aforementioned multi-type configuration shown in FIGS. 5(*a*), 5(*b*) may be adopted. In FIGS. 5(*a*), 5(*b*), the laser heads 6 are to be replaced by the laser heads 62.

In the above multi-type configuration, if the laser heads 7 are to be moved (pivoted) in the β-direction, it is permissible to pivot a shaft (e.g., slide member 24) common to the plurality of laser heads 62 by reflection direction adjusting means (pivoting means) such as a tilt drive motor, to pivot all the laser heads 62 simultaneously. Alternatively, reflection direction adjusting means (pivoting means), such as a tilt drive motor, may be provided individually for each laser head 62, and each laser head 62 may be pivoted individually.

The positions of movement and the positions of pivoting in the θ-, Z-, L-, γ-, β-, and α-directions are controlled to become predetermined positions with respect to the outer peripheral surface 2a of the piping 2 (straight pipe portion 22A, bending pipe portion 22B) by a drive control device based on position detection signals of position sensors, such as a rotary encoder and a linear encoder, which detect these positions of movement and these positions of pivoting, although relevant illustrations are omitted. The drive control device also controls the output of the laser light 23A emitted from the laser oscillation device, which in turn controls the irradiation intensity of the laser light 23A delivered from the laser head 62 and directed at the outer peripheral surface 2a of the piping 2 (straight pipe portion 2A, bending pipe portion 2B).

The drive control device, in particular, controls the pivoting means composed of the linear motor 68, etc., and the pipe axis direction moving means composed of the linear motor 64, to adjust the pivoting position or the position in the pipe axis direction of the laser head portion 63, thereby adjusting the relative positional relationship between the laser head portion 63 (laser head 62) and the outer peripheral surface 2a of the bending pipe portion 2B.

As shown in FIG. 8, for example, when the laser light 23A is shone onto the outer peripheral surface 2a on the ventral side of the bending pipe portion 2B (i.e., the side with a smaller radius of curvature; lower side in FIG. 8), the laser head portion 63 is pivoted by the pivoting means to become apart from the outer peripheral surface 2a of the bending pipe portion 2A. Moreover, the laser head portion 63 is moved rearwardly in the pipe axis direction (i.e., toward the straight pipe portion). By these measures, interference between the laser head portion 63 and the outer peripheral surface 2a of the bending pipe portion 2A is prevented. When the laser light 23A is shone onto the outer peripheral surface 2a on the dorsal side of the bending pipe portion 2B (i.e., the side with a larger radius of curvature; upper side in FIG. 8) the laser head portion 63 is pivoted by the pivoting means to become close to the outer peripheral surface 2a of the bending pipe portion 2A. Moreover, the laser head portion 63 is moved forwardly in the pipe axis direction (i.e., toward the bending pipe portion). By these measures, the laser head portion 63 (laser head 62) is prevented from becoming excessively remote from the outer peripheral surface 2a of the bending pipe portion 2B.

According to the residual stress improving apparatus 61 for piping of the present Embodiment 3, as described above, the following actions and effects are obtained, in addition to the same actions and effects as those in the residual stress improving apparatus 1 for piping of the aforementioned Embodiment 1.

That is, the residual stress improving apparatus 61 for piping according to the present Embodiment 3 is characterized by having the pivoting means (linear motor 68, coupling portion 71, coupling shaft 72, slot 70 of coupling portion 71, coupling member 74, pivot shaft 76 of coupling portion 77). This pivoting means pivots the laser head portion 63 in the plane, including the pipe axis 2b, about the pivot shaft 76 as the pivot center located on the rearward side in the pipe axis direction of the laser head portion 63, thereby enabling the forward side in the pipe axis direction of the laser head portion 63 to approach and separate from the outer peripheral surface of the bending pipe portion 2B. Thus, the laser head portion 63 can be approached to the outer peripheral surface 2a of the bending pipe portion 2B, and the laser light 23A can be shone onto the outer peripheral surface 2a, with the laser head portion 63 being prevented from interfering with the outer peripheral surface 2a on the ventral side and dorsal side of the bending pipe portion 2B. Thus, the outer peripheral surface 2a of the bending pipe portion 2B can be efficiently heated, so that the residual stress of the bending pipe portion 2B can be reduced. That is, a residual stress improving apparatus for piping, which is preferred for the bending pipe portion 2B, can be achieved.

Moreover, the residual stress improving apparatus 61 for piping according to the present Embodiment 3 is characterized by having the pipe axis direction moving means (linear motor 64). This pipe axis direction moving means moves the laser head portion 63 in the pipe axis direction, thereby making it possible to adjust, as appropriate, the position of irradiation of the outer peripheral surface 2a of the bending pipe portion 2B with the laser light 23A. Thus, the laser head portion 63 can be approached to the outer peripheral surface 2a of the bending pipe portion 2B, and the outer peripheral surface 2a can be irradiated with the laser light 23A, with the interference of the laser head portion 63 with the outer peripheral surface 2a on the ventral side and dorsal side of the bending pipe portion 2B being prevented more reliably. Thus, the outer peripheral surface 2a of the bending pipe portion 2B can be heated more efficiently, so that the residual stress of the bending pipe portion 2B can be reduced. That is, a residual stress improving apparatus for piping, which is more preferred for the bending pipe portion 2B, can be achieved.

The means of moving, the means of adjusting, and the means of pivoting in the respective directions (θ, Z, L, γ, β, α) in the above Embodiments 1 to 3 are not necessarily limited to the above-mentioned combination of the drive motor and the ball screw, and the linear motor, etc. Such means may be those capable of effecting movement, adjustment, pivoting, etc. in the respective directions. For example, various moving means, adjusting means, and pivoting means can be used, such as racks and pinions.

INDUSTRIAL APPLICABILITY

The present invention relates to a residual stress improving apparatus for piping, which is useful when reducing residual stress, generated in the straight pipe portion or the bending pipe portion of piping by welding or the like, by irradiating the outer peripheral surface of the straight pipe portion or the bending pipe portion with laser light to heat such a portion.

The invention claimed is:

1. A residual stress improving apparatus for piping, arranged to irradiate an outer peripheral surface of piping having a straight pipe portion with laser light, comprising:
   a laser head portion holding at least one laser head for delivering the laser light;
   circumferential direction moving unit moving the laser head, together with the laser head portion, along the outer peripheral surface of the straight pipe portion, and along a circumferential direction about a pipe axis of the straight pipe portion; and
   reflection direction adjusting unit adjusting an orientation of the laser head in a plane intersecting the pipe axis of the piping to adjust a direction of delivery of the laser light in the plane, thereby adjusting a direction of reflection of the laser light so that the laser light reflected by the outer peripheral surface of the piping does not return to the laser head.

2. The residual stress improving apparatus for piping according to claim 1, wherein
   the reflection direction adjusting unit adjusts an orientation of the laser head in a plane orthogonal to the pipe axis of the piping to adjust a direction of delivery of the laser light in the plane, thereby adjusting a direction of reflection of the laser light so that the laser light reflected by the outer peripheral surface of the piping does not return to the laser head.

3. The residual stress improving apparatus for piping according to claim 1, wherein
   the piping has the straight pipe portion, and a bending pipe portion continued from the straight pipe portion, and wherein
   an orientation of the laser head is adjusted in a plane including the pipe axis of the piping, whereby a direction of delivery of the laser light is adjusted in the plane so that an outer peripheral surface of the bending pipe portion located forwardly, in a direction of the pipe axis, of the laser head is irradiated with the laser light.

4. The residual stress improving apparatus for piping according to claim 3, further comprising:
   pipe axis direction moving unit moving the laser head portion along the pipe axis direction, thereby making it possible to adjust a position of irradiation with the laser light on the outer peripheral surface of the bending pipe portion.

5. The residual stress improving apparatus for piping according to claim 3, further comprising:
   oscillating unit moving the laser head in an oscillatory manner along the pipe axis direction; and
   output adjusting unit adjusting an output of the laser light so that the laser light delivered from the laser head at each oscillation position of the laser head has a uniform irradiation intensity on the outer peripheral surface of the bending pipe portion.

6. The residual stress improving apparatus for piping according to claim 3, wherein
a plurality of the laser heads are arranged along the pipe axis direction, and wherein
the residual stress improving apparatus for piping further comprises output adjusting unit adjusting an output of the laser light so that the laser light delivered from each of the plural laser heads has a uniform irradiation intensity on the outer peripheral surface of the bending pipe portion.

7. The residual stress improving apparatus for piping according to claim 1, wherein
the piping has the straight pipe portion, and a bending pipe portion continued from the straight pipe portion, and wherein
the residual stress improving apparatus for piping further comprises delivery direction adjusting unit adjusting an orientation of the laser head in a plane including the pipe axis of the piping, thereby adjusting a direction of delivery of the laser light in the plane so that an outer peripheral surface of the bending pipe portion located forwardly, in a direction of the pipe axis, of the laser head is irradiated with the laser light.

8. The residual stress improving apparatus for piping according to claim 1, wherein
the piping has the straight pipe portion, and a bending pipe portion continued from the straight pipe portion, and wherein
the residual stress improving apparatus for piping further comprises pivoting unit pivoting the laser head portion about a pivot center in a plane including the pipe axis, the pivot center being a pivot shaft located on a rearward side, in a direction of the pipe axis, of the laser head portion, thereby making it possible to bring a forward side, in the pipe axis direction, of the laser head portion close to and away from an outer peripheral surface of the bending pipe portion.

9. The residual stress improving apparatus for piping according to claim 8, further comprising:
pipe axis direction moving unit moving the laser head portion along the pipe axis direction, thereby making it possible to adjust a position of irradiation with the laser light on the outer peripheral surface of the bending pipe portion.

10. A residual stress improving apparatus for piping, arranged to irradiate an outer peripheral surface of piping having a straight pipe portion with laser light so as to heat the piping, comprising:
a laser head portion in which a plurality of laser heads for delivering the laser light are slidably provided to a slide member arranged in parallel to a direction of a pipe axis of the straight pipe portion; and
a circumferential direction moving unit moving the laser heads, together with the laser head portion, along the outer peripheral surface of the straight pipe portion and along a circumferential direction along the pipe axis of the straight pipe portion.

11. A residual stress improving apparatus for piping, arranged to irradiate an outer peripheral surface of piping having a straight pipe portion with laser light so as to heat the piping, comprising:
a laser head portion holding at least one laser head for delivering the laser light; and
a circumferential direction moving unit moving the laser head, together with the laser head portion, along the outer peripheral surface of the straight pipe portion and along a circumferential direction about a pipe axis of the straight pipe portion,
wherein the piping has the straight pipe portion and a bending pipe portion continued from the straight pipe portion, and
wherein the residual stress improving apparatus for piping comprises:
a pivoting unit pivoting the laser head portion around a pivot center in a plane including the pipe axis, the pivot center being a pivot shaft located on a rearward side, in a direction of the pipe axis, of the laser head portion, thereby making it possible to bring a forward side, in the pipe axis direction, of the laser head portion close to and away from an outer peripheral surface of the bending pipe portion;
a pipe axis direction moving unit moving the laser head portion along the pipe axis direction, thereby making it possible to adjust a position of irradiation with the laser light on the outer peripheral surface of the bending pipe portion; and
a driving control device making control such that
when the laser light is irradiated onto an outer peripheral surface having a smaller curvature radius of the bending pipe portion, interference between the laser head and the outer surface of the bending pie portion is prevented by pivoting the laser head portion by use of the pivoting unit so as to move the laser head portion away from the outer peripheral surface of the bending pipe portion, and by moving the laser head portion to the side of the straight pipe portion,
when the laser light is irradiated onto an outer peripheral surface having a larger curative radius of the bending pipe portion, the laser head portion is prevented from moving too far away from the outpour peripheral surface of the vending pipe portion by pivoting the laser head portion by use of the pivoting unit to bring the laser head portion closer to the outer peripheral surface of the bending pipe portion, and by moving the laser head portion to the side of the bending pipe portion.

12. A residual stress improving apparatus for piping arranged to irradiate an outer peripheral surface of piping having a straight pipe portion with laser light so as to heat the piping, comprising:
a laser head portion holding at least one laser head for delivering the laser light;
a circumferential direction moving unit moving the laser head, together with the laser head portion, along the outer peripheral surface of the straight pipe portion and along a circumferential direction about a pipe axis of the straight pipe portion;
an oscillating unit moving the laser head in an oscillatory manner along the pipe axis direction; and
a delivery direction adjusting unit adjusting an orientation of the laser head in a plane including the pipe axis of the piping, thereby adjusting a direction of delivery of the laser light in the plane so that an outer peripheral surface of the bending pipe portion located forwardly, in a direction of the pipe axis, of the laser head is irradiated with the laser light,
wherein the oscillating unit is a linear motor while the delivery direction adjusting unit is a tilt drive motor,
the laser head portion includes a stationary portion of the linear motor, the stationary portion being arranged in parallel to the pipe axis direction, and a moving portion of the linear motor, the moving portion moving along the linear motor fixing portion in the pipe axis direction, and
the laser head is attached to the linear motor moving portion via the tilt drive motor.

* * * * *